United States Patent [19]
Petersen

[11] B 4,000,499
[45] Dec. 28, 1976

[54] GALVANO-MAGNETIC EFFECT CONTROL SYSTEM FOR PHOTOGRAPHIC APPARATUS

[75] Inventor: Christian C. Petersen, Westwood, Mass.

[73] Assignee: Polaroid Corporation, Cambridge, Mass.

[22] Filed: Sept. 18, 1974

[21] Appl. No.: 507,131

[44] Published under the second Trial Voluntary Protest Program on March 2, 1976 as document No. B 507,131.

[52] U.S. Cl. .............................. 354/156; 307/278
[51] Int. Cl.² .................... G03B 19/12; H03K 3/00
[58] Field of Search ............... 354/23, 24, 26, 29, 354/30, 36, 38, 48, 50, 60, 156, 86; 307/278

[56] References Cited
UNITED STATES PATENTS

| | | | |
|---|---|---|---|
| 3,610,968 | 10/1971 | Yamada | 307/278 X |
| 3,744,385 | 7/1973 | Burgarella et al. | 354/23 D |

Primary Examiner—Richard A. Wintercorn.
Attorney, Agent, or Firm—Edward S. Roman

[57] ABSTRACT

An exposure control system is provided for a photographic apparatus in order to selectively actuate drive means including a tractive electro-magnetic means together with other instrumentality means to perform various functions in a predetermined order in the course of producing a photographic record. The control system includes a galvano-magnetic effect means having a predetermined output signal condition responsive to the magnetic field condition of the tractive electro-magnetic means. The galvano-magnetic effect means includes a Hall effect switching device stationed in proximate relation to the tractive electro-magnetic means. The galvano-magnetic effect means may further include a delay means for delaying the time of transmission of a change in the output signal condition from the Hall effect switching device together with a latching means having at least two output signal conditions, the first of which is indicative of a magnetic field intensity below a predetermined level and the second of which is assumed as a result of the magnetic field intensity increasing above the predetermined level. Once the second output signal condition of the latching means is assumed, it will remain thereafter regardless of the level of the magnetic field intensity or output signal condition from the Hall effect switching device and will change back to the first output signal condition only upon receipt of an appropriate trigger signal.

17 Claims, 5 Drawing Figures

| # | EVENT SEQUENCE | GATE A<br>a b c t₁ | GATE B<br>a c t₂ | GATE C<br>a b d t₃ | GATE D<br>e f t₄ | GATE E<br>g t₅ | GATE F<br>h t₆ | GATE G<br>i t₇ |
|---|---|---|---|---|---|---|---|---|
| 1 | START SWITCH CLOSED-FIRST LATCH ENERGIZATION STATE | 0 0 0 1 | 0 0 0 | 0 0 0 1 | 1 1 0 | 0 1 | 1 0 | 1 0 |
| 2 | SHUTTER CLOSES, HALL EFFECT DEVICE ACTUATES, MOTOR ENERGIZES | 0 1 0 0 | 0 0 0 | 0 1 0 0 | 1 0 1 | 1 0 | 0 1 | 0 1 |
| 3 | SOLENOID POWERS DOWN, REFLEX COMPONENT RISES, S-5 OPENS, SECOND LATCH ENERGIZATION STATE | 0 1 0 0 | 0 0 0 | 0 1 1 1 | 1 0 1 | 1 0 | 1 0 | 0 1 |
| 4 | S-3 OPENS-DELAY INTERVAL COMMENCES | 0 1 0 0 | 0 1 1 | 0 1 1 1 | 1 0 1 | 1 0 | 1 0 | 0 1 |
| 5 | COMMENCE EXPOSURE | 0 0 1 0 | 1 1 0 | 0 0 1 1 | 1 1 0 | 0 1 | 1 0 | 1 0 |
| 6 | TRIGGER-286 THRESHOLD REACHED | 1 0 1 1 | 1 1 0 | 1 0 1 1 | 1 1 0 | 0 1 | 1 0 | 1 0 |
| 7 | SHUTTER CLOSES, HALL EFFECT DEVICE ACTUATES, S-3 CLOSES | 1 1 1 0 | 1 0 0 | 1 1 1 0 | 1 0 1 | 1 0 | 0 1 | 0 1 |
| 8 | S-4 CLOSES | 1 1 0 0 | 1 0 0 | 1 1 0 1 | 1 0 1 | 1 0 | 0 1 | 0 1 |

FIG. 5

GALVANO-MAGNETIC EFFECT CONTROL SYSTEM FOR PHOTOGRAPHIC APPARATUS

BACKGROUND OF THE INVENTION

1. Field of the Invention

This invention relates to a control system for a photographic apparatus and more particularly to a control system for photographic apparatus wherein the control system embodies galvano-magnetic effect switching devices.

2. Description of the Prior Art

Thin and compact photographic cameras of the reflex type have been developed wherein the exposure of the film unit is electronically controlled and the film unit may be rapidly processed at a processing station within the photographic camera. A version of such a camera having a compactness and thinness suited to permit convenient carrying in the pocket of a garment is described in a U.S. Pat. entitled "Reflex Camera" by E. H. Land, No. 3,672,281. Such cameras are of the single lens reflex variety and require a complex exposure control system in order to accommodate a requisite viewing and focusing mode during which time the single lens reflex camera is in a normally open status to unblock the passage of light through the exposure opening to a viewfinder. At the commencement of an exposure cycle, the shutter mechanism of the camera exposure control system is driven into a closed or light blocking orientation by a tractive electromagnetic device whereupon the photographic camera is automatically operated to change from the viewing and focusing mode to an exposure mode in which photosensitive film is made accessible to the optical path of the taking lens of the camera. When the camera has assumed the exposure mode of operation, the exposure control system operates to release a shutter mechanism from its light blocking orientation wherein such exposure control parameters as exposure interval and aperture size are controlled as a function of scene brightness as evaluated with respect to the sensitometric characteristics of the film being exposed. At the termination of the electronically determined exposure interval, the shutter is again driven to a fully closed or light blocking position to terminate exposure until such time as a camera reassumes the viewing or focusing mode.

Single reflex photographic cameras embodying the above-described exposure control system are suitable for use with film units described in detail in U.S. Pat. to E. H. Land, No. 3,415,644 entitled "Novel Photographic Products and Processes". Such film units include all the materials necessary to produce a positive photographic print by an image-forming process which is now well known in the art and involves the formation of transverse image-forming substances in an exposed photosensitive element by their diffusion in a manner forming a visual positive image.

Exposure mechanisms of such photographic cameras generally include at least two cooperatively moving shutter blades which ride transversely within supporting tracks. The blades are formed with selectively shaped aperture openings which, depending upon the position of the blades, symmetrically overlap over a light entering exposure opening within the camera housing. Such blades may be connected to define a progression of apertures over the light entering opening in the camera as a result of their connection with a so-called "walking beam" which is rotatably mounted with respect to the camera housing. The "walking beam" is selectively rotated through a tractive electromagnetic device such as a solenoid, the plunger of which is arranged to actuate a mechanical switch upon full retraction thereof. The mechanical switch in return provides a signal to the exposure control system indicative of when the shutter blades have been moved into a closed terminal position. The use of a mechanical switch in the above-described manner, although entirely satisfactory for its intended purpose, incurs one drawback due to the production of bounce when the contact is closed. Such bounce is, of course, undesirable and would preferably be eliminated. A second problem that exists is a tendency for a mechanical switch to have a relatively limited life when compared to the invention of the present application.

Therefore, it is a primary object of this invention to provide a reliable exposure control system for a photographic apparatus where at least one mechanical switching device in the exposure control system can be eliminated.

It is also an object of this invention to provide a reliable exposure control system for a photographic camera apparatus wherein a galvano-magnetic effect switching means may be used in place of a mechanical switch.

It is a further object of this invention to provide a reliable exposure control system for a photographic camera apparatus wherein the adverse effects generally associated with the bounce of a mechanical switch as hereinbefore utilized may be eliminated by a galvano-magnetic effect switching circuit embodying a Hall effect switching device.

It is an even further object of this invention to provide a reliable exposure control system for a photographic camera apparatus wherein the useful life of the control system may be increased by substituting a galvano-magnetic effect switching circuit embodying a Hall effect device in place of a mechanical switch as heretofore used.

SUMMARY OF THE INVENTION

The present invention relates to a photographic apparatus of a type having instrumentality means actuable to perform various functions in the course of producing a photographic record. The camera apparatus additionally includes drive means of the type having a tractive electro-magnetic means energizable to attain a high magnetic field condition for selectively actuating the instrumentality means to perform at least one of the functions. There are also provided control means for selectively actuating the drive means in a predetermined order wherein the control means include a galvano-magnetic effect means having a predetermined output signal condition responsive to the magnetic field condition of the tractive electro-magnetic means. The galvano-magnetic effect means includes a Hall effect switching device stationed in proximate relation to the tractive electro-magnetic means so as to have an output signal condition responsive to the high magnetic field condition.

The galvano-magnetic effect means may additionally include delay means for delaying the time of transmission of a change in the output signal condition from the Hall effect switching device in response to the magnetic field intensity reaching some predetermined level of intensity. In this manner the output signal condition from the Hall effect device may be made responsive to a predetermined level of magnetic field intensity not necessarily coinciding with the fully retracted position of the tractive electro-magnetic device. The delay time, however, must always be of sufficient duration to enable the tractive electro-magnetic device to assume its fully retracted position before the change in signal condition from the Hall effect switching device is transmitted by the delay means.

The galvano-magnetic effect means may further include a triggering means for providing a trigger signal in response to a predetermined event together with a latch means responsive to both the output signal condition of the Hall effect switching device and the trigger signal of the triggering means. The latch means has at least two output signal conditions, the first of which is indicative of a magnetic field intensity below a predetermined level and the second of which is assumed as a result of the magnetic field intensity increasing above the predetermined level to change the output signal condition of the Hall effect switching device. The second output signal condition from the latch means, once assumed, will remain thereafter regardless of the level of the magnetic field intensity or output signal condition from the Hall effect switching device and will change back to the first output signal condition only upon receipt of the trigger signal from the triggering means in response to the predetermined event.

BRIEF DESCRIPTIONS OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiments when read in connection with the accompanying drawings wherein:

FIG. 5 is a truth table or schedule of operational events performed by the exposure control system of the camera apparatus of FIG. 1 showing in logic form the input and output status of multi gate functions incorporated within the circuit of FIG. 4.

DETAILED DESCRIPTION

Figure 1:
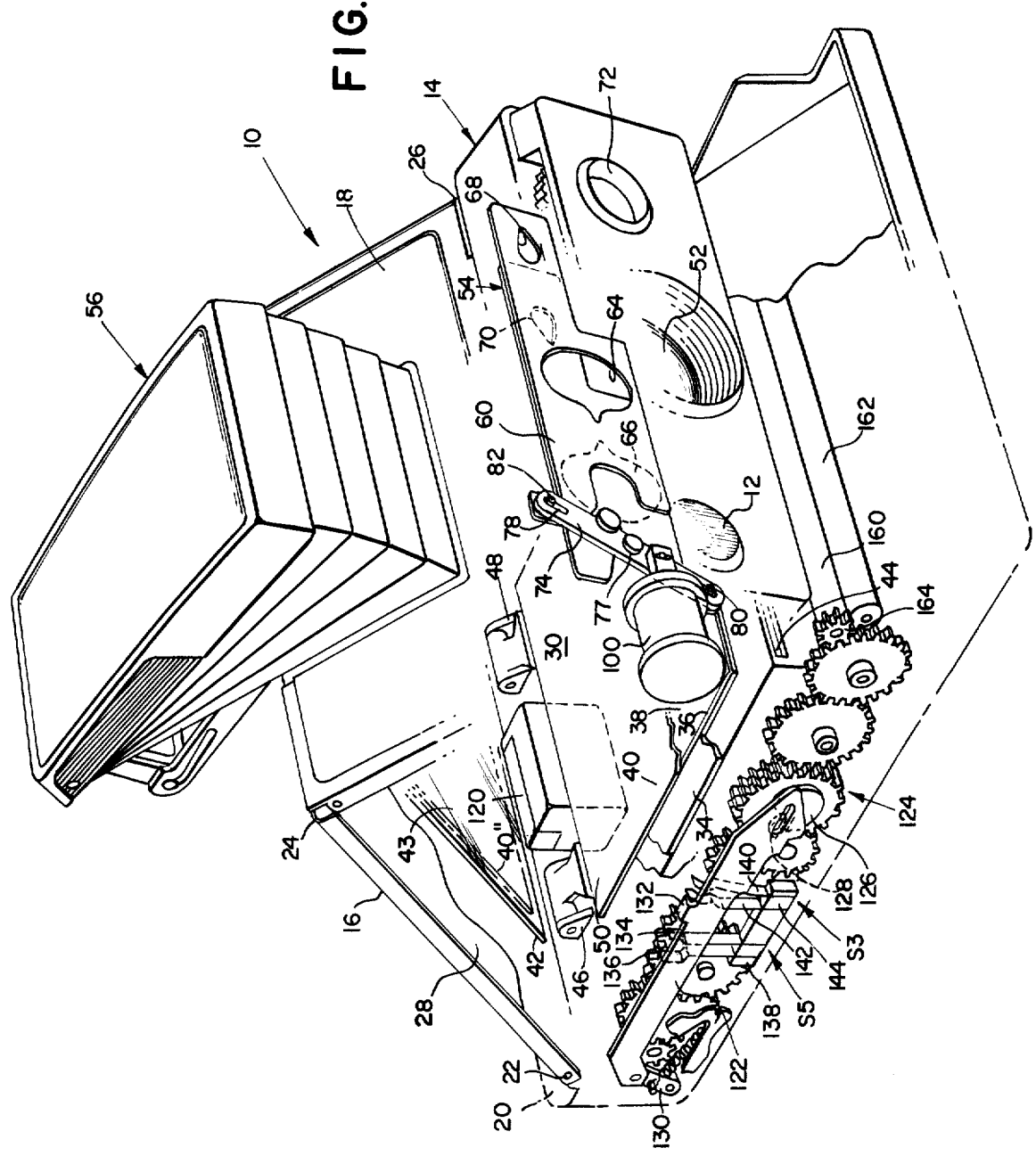
FIG. 1 is a perspective view, partly in cross-section, of a photographic camera apparatus embodying the means of the present invention.

Referring to FIG. 1, a fully automatic camera incorporating the features of the instant invention is portrayed generally at 10. In the course of a single photographic cycle, the components of camera 10 are automatically re-arranged from positions defining a viewing and focusing mode to orientations establishing an exposure mode, following which the initial viewing and focusing mode is re-established and an exposed film unit is automatically processed. The operational events establishing these mode conversions are sequentially carried out in response to a momentary depression of a singular start button 12 mounted within the forward face of an exposure housing 14. Exposure housing 14 is the forwardmost of a grouping of mutually pivoted or articulated housing components including a rear wall 16, a forward wall 18 and a base member 20. These components are pivotally associated with base member 20 so as to be foldable thereinto in nesting fashion. When so folded from the erected configuration shown, the camera 10 assumes a thin and compact shape suiting it to be conveniently carried in the pocket of a garment. The specific hinge connections providing for the articulated structure, while not being visible in the figure, are positioned at axes 22, 24, 26 and at the lower rear portion of exposure housing 14. When erected for making an exposure, rear wall 16, forward wall 18 and exposure housing 14 combine in conjunction with an opaque flexible bellows, a portion or fragment of which is illustrated at 28, to define an exposure chamber generally depicted at 30.

A film supply for camera 10 is provided by a disposable film retaining cassette 32 positioned within base member 20. Cassette 32 is removably positioned against an innerframe, a portion of which is shown at 34. Innerframe 34 is located at and defines the lower surface of exposure chamber 30. Formed having an upward facing rectangular film frame opening defined by a ridge 36, cassette 32 retains a stacked assemblage of film units. The uppermost one of these film units 38 is biased against the bottom of film frame ridge 36, a position coinciding with the exposure plane of camera 10.

Incorporating a highly refined viewing and focusing system, the camera 10 operates in a modified reflex fashion, being convertible between viewing and exposure operational modes by a reflex assembly including a somewhat planar reflex reflecting component 40 shown in solid line fashion at a terminal position during the viewing-focusing mode of operation. The component 40 is movable during a photographic cycle from the position representing its viewing-focusing mode orientation to a position shown in phantom 40" adjacent a mirror 42 positioned at the inner side of rear wall 16 representing its exposure operational mode orientation. Movement between the viewing-focusing and exposure mode positions illustrated in phantom is pivotal, the component 40 being coupled to a rearward portion of inner frame 34 by hinge connections 46 and 48.

Fabricated of a material opaque to light, reflex component 40 serves a dual function when in its viewing-focusing mode position. In particular, when at the noted position, component 40 extends over and secures or seals the film frame opening defined by ridge 36 of cassette 32. Component 40 additionally is structured to support a viewing surface 50 on its upwardly facing side.

When oriented for viewing and focusing purposes, the components of camera 10 establish an optical path extending from a taking or objective lens assembly mounted within exposure housing 14 at 52, through an open exposure mechanism shown generally at 54, thence to mirror 42 shown positioned at the inner side of rear wall 16 and thence to viewing surface 50 positioned on the upward surface of component 40. Viewing surface 50 is configured having a texture and optical design facilitating the focusing of the image of the scene to be photographed. This image may be viewed by the camera operator through a collapsible optical entrance assembly depicted generally at 56. A configuration suited for viewing surface 50 is described and claimed in a U.S. Pat. No. 3,690,240, filed Oct. 22, 1970, by Nathan Gold, entitled, "Reflective Imaging Apparatus," and assigned in common herewith, while the assembly 56 and its related internal components are described in detail and claimed in a copending application for U.S. Pat. by James G. Baker, filed Dec. 15, 1970, entitled, "Reflex Camera and Viewing Device," Ser. No. 98,356 (now abandoned).

To enhance the viewing and focusing performance of the camera when in its viewing-focusing operational mode, exposure mechanism 54 must be operative not only to remain open during this operational mode, but also to establish an aperture opening of maximum available size. Mechanism 54 is ideally suited for performing under this operational criteria and is described in more detail and claimed in a U.S. Pat. entitled "Exposure Control System," by V. K. Eloranta, No. 3,681,889.

Figure 2:
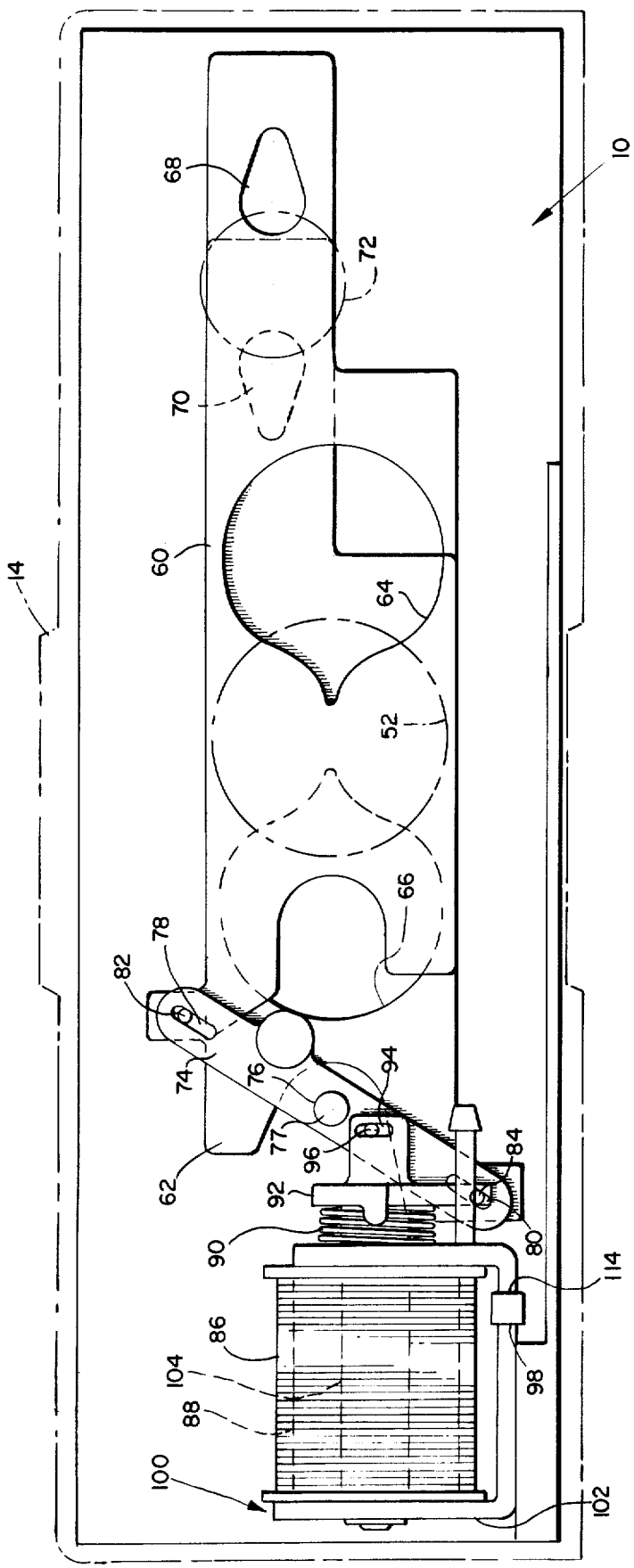
FIG. 2 is a front cross-sectional view of the exposure housing of the photographic camera apparatus of FIG. 1.

Referring additionally to FIG. 2, exposure mechanism 54 is seen to comprise two blades or elements 60 and 62 which slideably ride across housing 14 in a track (not shown). Each blade, 60 and 62, is formed having a teardrop-shaped aperture opening shown respectively at 64 and 66. Additionally, the blades are formed having secondary openings shown respectively at 68 and 70 which move cooperatively before the light detecting elements of a photosensing network positioned behind an entrance optical assembly 72.

Openings 64 and 66 of respective blades 60 and 62 are mounted for movement across the optical path of the camera 10 as it is established at taking lens 52. Depending upon the position of blades 60 and 62, openings 64 and 66 symmetrically overlap to define selectively varying aperture sizes. Secondary openings 68 and 70 are configured in correspondence with the contours of respective openings 64 and 66. These openings also move in mutual symmetry over the optical path of the light sensing network.

Blades 60 and 62 move in the noted mutual symmetry as a result of their connection with a walking beam as shown at 74. Walking beam 74 is formed having a centrally disposed hub portion 76 which is journaled for rotation about an upstanding stud 77 extending from the rearward portion of exposure control housing 14. Elongate slots, as at 78 and 80, are formed in the outward tip portions of walking beam 74 for the purpose of providing connection with pins 82 and 84 extending, respectively, from blades 60 and 62.

Thus interconnected, the blades 60 and 62 move simultaneously and in correspondence with each other to define a continuous progression of symmetrically configured variable aperture openings over the camera optical path at taking lens 52 as well as over the light sensing network optical path at 72.

Movement of blades 60 and 62 from their normally open orientation permitting viewing and focusing into a closed orientation blocking the passage of light along the optical path of the camera is carried out by a tractive-electro-magnetic device present as a solenoid 100 mounted within exposure housing 14 upon a U-shaped ferromagnetic bracket as at 102. Solenoid 100 is designed having an internally disposed cylindrical ferromagnetic plunger or armature 104 which retracts inwardly within an excitation winding 86 upon energization thereof. Excitation winding 86 is wound about a bobbin 88 attached to the U-shaped bracket 102. The cylindrically shaped plunger 104 is slideably mounted within a corresponding central opening within bobbin 88 and the composite assembly is fixed within exposure housing 14. An opening spring 90 is mounted about plunger 104 between bracket 102 and a plunger cap 92. Cap 92 is formed having a slot 94 which loosely receives a pin 96 fixed to and extending from a lower portion of the walking beam 74. The bracket 102 is additionally transversely slotted at 114 to receive a Hall effect switching device 98, the function of which will be subsequently described in detail.

When solenoid 100 is energized to retract plunger 104, walking beam 74 is rotated rapidly against the bias of spring 90 to move blades 60 and 62 into the fully closed orientation shown in FIG. 1. Note in FIG. 1 that the optical path of the camera as defined through taking lens 52 is completely blocked, thereby securing exposure chamber 30 from the presence of scene light.

During a viewing focusing operational mode, when spring 90 holds blades 60 and 62 in a terminal position defining maximum aperture, reflex component 40 is held in its light securing position 40 by an actuator system which operates through the interaction of drive springs (not shown) normally biasing component 40 into its elevated position 40'' with a motor driven latching arrangement. Described in detail and claimed in a U.S. Patent by E. H. Land, I. Blinow, and V. K. Eloranta, entitled, "Reflex Camera," No. 3,714,879, filed Apr. 16, 1971, and assigned in common herewith, the actuator system utilizes the output of a motor 120 to regulate a mechanical control linkage including a ram 122 by selectively driving an elongate, thin gear train, certain components of which are shown generally at 124 extending along one side of camera 10. Gear train 124 includes one reduction ratio circuit terminating in a phase control cam 126 which is rotatably driven through one revolution during the course of a single photographic cycle. Cam 126 operates in conjunction with a cam follower 128 mounted upon the inwardly facing side of elongate ram 122. Ram 122, in turn, is slideably positioned along the outer face of gear train 124 and is driveably connected to an input bell crank 130. Bell crank 130 is coupled into hinge assembly 46 through the noted drive springs which continually bias reflex component 40 to pivot about hinges 46 and 48 into position 40'' abutting the innerface of rear wall 16. This drive spring as well as other associated linkages required to provide this upward bias are described in detail in the noted U.S. Pat. No. 3,714,879.

Through controlled, selective energization of motor 120, the cooperating cam 126 and cam follower 128 serve to retain reflex component 40 in position when the camera 10 is in its viewing-focusing mode. When so retained, cam 126 is in a radial orientation wherein it holds follower 128 and associated ram 122 at a terminal rearward position. An energization of motor 120 early in a given photographic cycle causes the gear train to rotate cam 126 to a position whereat follower 128 releases from follower contact therewith, permitting ram 122 to be driven by the drive springs of the camera to a terminal forward position and, as a consequence, simultaneously permitting reflex component 40 to be driven into its exposure mode position 40''. During this mode transition, exposure mechanism 54 assumes the fully closed condition shown in FIG. 1. Note, that follower 128 is off of the contact surface of cam 126 thereby providing its free forwardly directed movement.

As ram 122 commences forward movement in conjunction with the release of reflex component 40 from its position at 40, an inwardly extending tab 132 releases from engagement with a resilient leaf 134 of a switch identified generally as $S_5$. Switch $S_5$ additionally includes a resilient leaf 136 which is supported along with leaf 134 from an insulative base 138 fixed to base member 20. Accordingly, the contacts 134 and 136 of switch $S_5$ are opened in correspondence with the initial movement of component 40 from its position at 40. As reflex component 40 somewhat closely approaches its seated position at 40'', tab 132 contacts leaf 140 of another switch depicted generally at $S_3$. Leaf 140 is normally in contact with leaf 142 and is supported along with contact 142 from an insulative base 144 also fixed to base member 20. It may be noted, therefore, that the contacts of switch $S_3$ are opened when reflex component 40 approaches its seated position 40''.

When reflex component 40 reaches position 40'' exposure mode performance ensues with the de-energization of solenoid 100 to release walking beam 74 for rotation under the bias of spring 90. As walking beam 74 rotates and a progressively enlarging aperture opening is defined by blades 60 and 62, the optical path of camera 10 is reoriented to extend from taking lens 52 through exposure mechanism 54, thence to a mirror 43 positioned on the downward facing side of component 40, thence to the exposure plane and uppermost film unit 38. An exposure is terminated with the re-energization of solenoid 100 to block the optical path, which energization continues until camera 10 has re-assumed its viewing-focusing mode orientation.

With exposure chamber 30 secured by the closure of blades 60 and 62, motor 120 is re-energized to drive gear train 124, thereby rotating cam 126. As cam 126 is rotated, contact is re-asserted with follower 128 to drive ram 122 rearwardly and cock reflex component 40 into its viewing mode position. Simultaneously with this cocking activity, a second reduction circuit within gear train 124 functions to drive the uppermost one of a pair of processing rolls 160 and 162. Connection between the upper processing roll 160 and gear train 124 is made at a drive pinion 164. During a cocking procedure, a pick mechanism (not shown) urges uppermost film unit 38 from its position within cassette 32 through an egress slot 44 and into the bite or point of contact between rolls 160 and 162. Described in detail in a U.S. Pat. by E. H. Land, No. 3,415,644, entitled, "Novel Photographic Products and Processes," film units as at 38 are structured to contain a processing fluid which is spread therewithin to cause the formation of a visible positive image. At the termination of the above-described cocking and processing functions, the control system of camera 10 is automatically shut down to terminate the photographic cycle.

Figure 3:
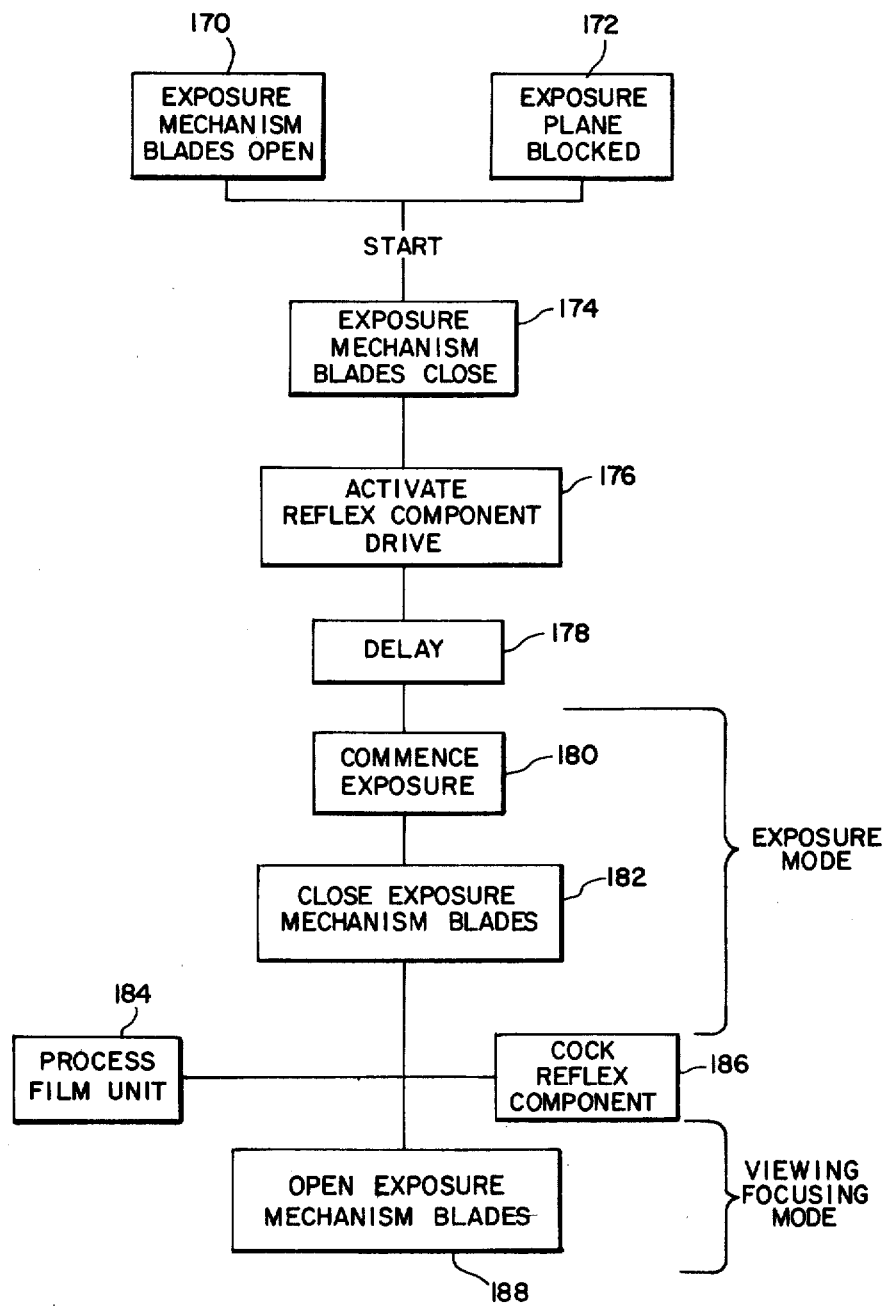
FIG. 3 is a schematic representation in block diagram form of the various operational events occuring during a photographic cycle for the photographic apparatus of FIG. 1.

Turning to FIG. 3, the control events carried out by the instrumentalities of camera 10 are identified in block diagrammatic fashion. Prior to starting a photographic cycle, the components of camera 10 assume viewing-focusing mode orientations in which exposure mechanism blades 60 and 62 locate openings 64 and 66 to establish an aperture of maximum available size, as provided by a de-energization of solenoid 100. Additionally, the exposure plane of camera 10 at 38 is secured as a consequence of reflex component 40 being latched at position 40. This initial status is revealed at blocks 170 and 172.

Once a scene is appropriately framed and focused, start button 12 is momentarily depressed to close a switch and energize solenoid 100. As solenoid 100 is energized, walking beam 74 is rotated against the bias of spring 90 to block the optical path. This event is depicted at block 174.

When exposure chamber 30 is secured by the optical path, motor 120 is initially energized to release reflex component 40 for movement from position 40 into position 40''. This activity is depicted at block 176.

Following a period of time adequate for component 40 to reach position 40'' as depicted at delay block 178, an exposure is commenced with the de-energization of solenoid 100 to release blades 60 and 62, thereby permitting openings 64 and 66 to define progressively enlarging apertures. This exposure activity is depicted at block 180. Note additionally, that the exposure mode performance of the camera commences following delay 178. The light sensing network of the camera provides a signal when an appropriate aperture is defined by blades 60 and 62, which signal causes the re-energization of solenoid 100 to terminate an exposure by closing blades 60 and 62. This exposure termination is depicted at block 182. Note that the exposure mode of the camera terminates at this point and processing as shown at 184 as well as cocking activity ensues at 186.

When processing and cocking is completed, the control system of camera 10 is shut down, solenoid 100 is de-energized and blades 60 and 62 reassume their viewing-focusing mode positions. The latter de-energization of solenoid 100 is depicted at block 188.

Figure 4:
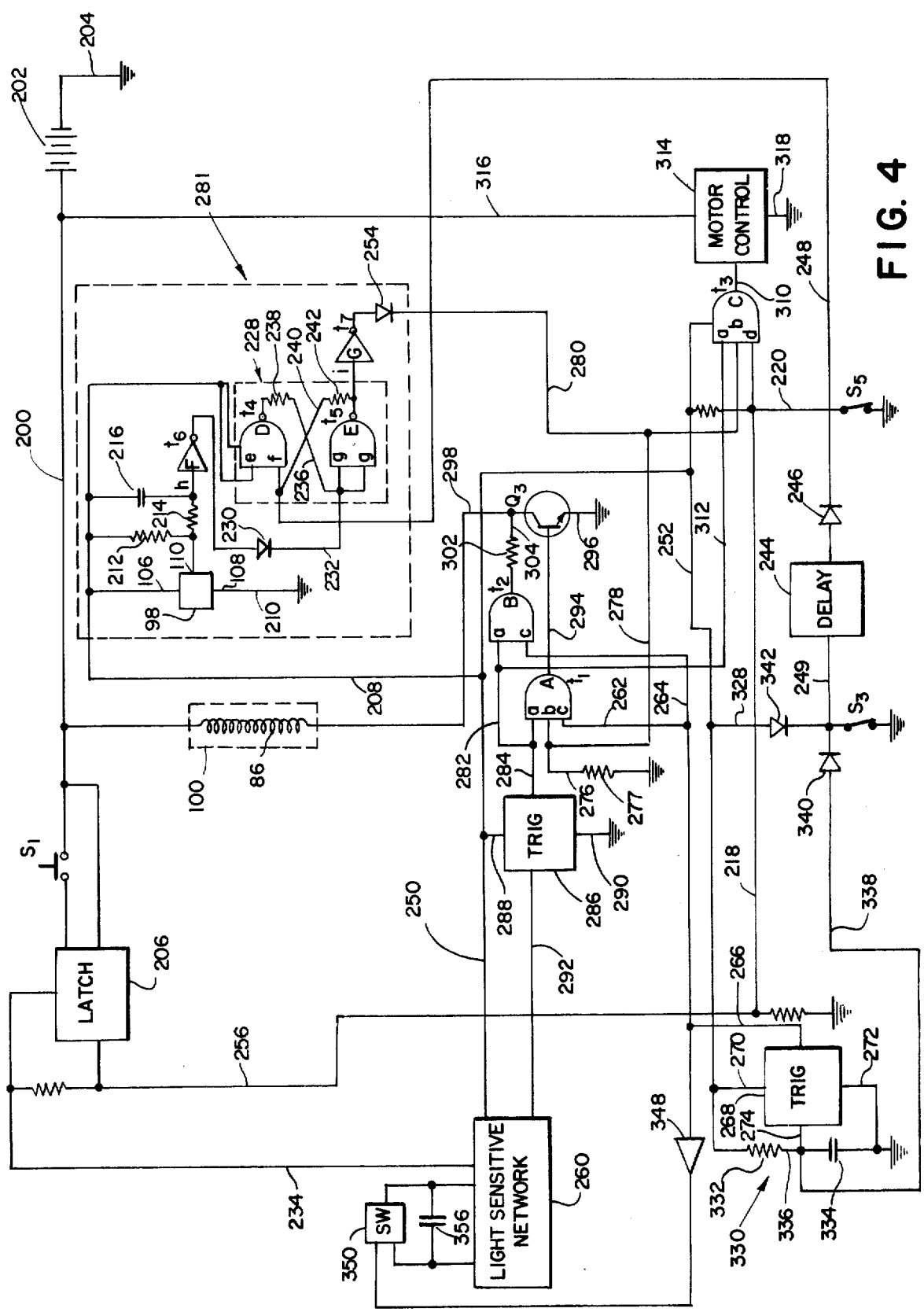
FIG. 4 is a schematic representation of a control circuit as used in conjunction with the exposure control system of the camera apparatus of FIG. 1.

Referring to FIG. 4, a control circuit for operating camera 10 in accordance with the above-described program is depicted. As noted earlier, a photographic cycle is commenced with the depression of start button 12. This depression serves to close a switch designated $S_1$ in the figure. Switch $S_1$ is normally biased towards an open circuit condition. Closure of switch $S_1$ activates a primary power line 200. Line 200 is connected with the positive side of a battery 202. The opposite side of battery 202 is connected through line 204 to ground.

When activated, line 200 serves to energize a latching circuit indicated generally at 206. Upon being energized, latching circuit 206, which is fully described in U.S. Pat. No. 3,744,385 to John Burgarella et al, then operates to energize auxiliary power line 234. The energization of auxiliary power line 234, in turn, energizes branch power line 250, also energizing branch power line 252. Branch power lines 250 and 252, when so energized, establish the initial conditions at the input and output terminals of the components on the control circuit assuring the commencement of a photographic cycle. These initial inputs and outputs for multi-function gates A, B, C, D, E, F and G are depicted in Boolean enumeration in FIG. 5 at event No. 1.

For purposes of understanding the tabulations of FIG. 5, as well as to facilitate the description to follow, when the inputs or outputs of such components are at ground reference potential, they are referred to as "low," and/or such output is digitally indicated as 0. Conversely, when these inputs and outputs assume or approach the voltage status of power line 200, they are referred to as being "high" and are given the binary designation 1. It may be noted further, that certain of the gate input terminals receive common signals. These input terminals are identified by letters $a$-$i$. Additionally, the output terminals of multi-function GATES A, B, C, D, E, F and G are identified respectively as $t_1$, $t_2$, $t_3$, $t_4$, $t_5$, $t_6$ and $t_7$.

Energization of branch power line 250 at the commencement of a photographic cycle serves to establish those input conditions shown as event No. 1 of FIG. 5 at the input terminals of multi-function power GATES A and B. These input conditions are derived both from the positions of the switches within the circuit as well as from the output of a light sensitive exposure control network depicted generally at 260. More particularly, the $c$ gate input terminals of GATES A and B are "low" and are derived respectively from lines 262 and 264. Line 264 is coupled through line 266 to the output of a Schmitt trigger 268. Schmitt trigger 268 may be of conventional design, having a normally non-conductive input stage and a normally conductive output stage. Energized from branch power line 252 through line 270 and coupled to ground through line 272, the output at 266 of Schmitt trigger 268 remains "low" until a signal is received at its input 274 which is at least equal to a predetermined reference level. Upon receipt of such signal, the output at line 266 assumes a "high" status. Accordingly, common gate input $c$ remains "low" pending the triggering of Schmitt trigger 268.

Gate input terminal $b$ of GATE A exhibits a "low" status by virtue of its connection through line 276 and resistor 277 to ground. Additionally, this status is permitted as a result of its connection through lines 278 and 280 to a galvano-magnetic effect switching circuit shown generally at 281. Switching circuit 281 replaces a mechanical switch as was heretofore used in cameras of the above described type and it is to this switching circuit that the subject invention is directed as will become more apparent from the following discussion.

Common gate input terminals $a$ of GATES A and B are initially "low" as a result of their connection from along lines 282 and 284 to the output of another Schmitt trigger 286. Schmitt trigger 286 is energized through line 288 from branch power line 250 and is coupled to ground through line 290. Similar to Schmitt trigger 268, the output of Schmitt trigger 286 is normally "low" and will assume a "high" status in response to the receipt at its input 292 of a signal above a predetermined triggering or threshold level. The status of input 292 is regulated by an exposure control signal generated at network 260.

The resultant initial output $t_1$ of GATE A which is present at line 294 is "high" and is imposed upon the base of an NPN transistor $Q_3$. The emitter of transistor $Q_3$ is coupled along line 296 to ground, while its collector is connected to line 298. Line 298, in turn, connects the excitation winding 86 of solenoid 100 to primary power line 200. Solenoid 100 is designated functionally in FIG. 4 by a dashed boundary. The "high" status at line 294 serves to forward bias the base-emitter junction of transistor $Q_3$, thereby energizing winding 86 to cause exposure mechanism 54 to block the optical path of camera 10. The output $t_2$ of GATE B is "low" at the commencement of a photographic cycle and is coupled through a current limiting resistor 302 and line 304 to line 298. GATE B serves a powering down function wherein solenoid 100 is energized at a lower current level when the plunger thereof is in its fully retracted position. To carry this out, GATE B diverts solenoid energizing current through limiting resistor 302. When transistor $Q_3$ is forward biased, however, this diversion through resistor 302 is insignificant. The powering down feature of the control system is described and claimed in a U.S. Pat. by C. H. Biber and E. K. Shenk entitled, "Photographic Apparatus with Solenoid Powered Instrumentalities," No. 3,791,278, filed July 19, 1971 and assigned in common herewith.

Referring now to the galvano-magnetic effect switching circuit 281 of this invention, there is shown the Hall effect device 98 which is physically located in magnetic field intercepting relation within the slotted ferromagnetic bracket 102. Switching device 98 operates as a result of the so-called Hall effect which is a galvano-magnetic effect. For example, if a magnetic field is applied to a current carrying conductor, electrons in the conductor are deflected in a direction perpendicular to both the current flow and magnetic field. Because the electrons must travel within the confines of the conductor, an excess of electrons on one side of the conductor relative to the other causes an electric field to be established which juxtaposes the force produced by the magnetic field. By applying suitable contacts to the sides of the conductor, it then becomes possible to detect and utilize this "Hall" voltage in the following manner.

Hall effect switching device 98 has three contacts 106, 108 and 110 wherein the contacts 106 and 108 constitute the input contacts to the Hall effect device 98 with the output contact being shown at 110. Contact 106 is connected to the branch power line 250 by an interconnecting line 208 while contact 108 is connected to ground through an interconnecting line 210. When not under the influence of a magnetic field as is the case when the solenoid 100 is de-energized, the output voltage at contact 110 is pulled up to the level of the voltage of the branch power line 250 by a pull-up resistor 212. Output contact 110 is also connected through a resistor 214 to input terminal $h$ of inverting GATE F. A timing capacitor 216, the function of which will be subsequently described, is connected between the input terminal $h$ and line 208. The gate output terminal $t_6$ of inverting GATE F is connected by way of a diode 230 to a second latching circuit shown generally at 228. Latching circuit 228 includes two Nand GATES D and E wherein GATE D has a pair of common input terminals $g$ connected to the cathode of diode 230 by way of line 232. Common input terminals $g$ are also connected by way of line 236 and resistor 238 with the output terminal $t_4$ of GATE D. Input terminal $e$ to GATE D is maintained at the voltage level of the branch power line 250 by virtue of its connection to line 250 through line 208. Input terminal $f$ to GATE D is connected to output terminal $t_5$ of GATE E by way of line 240 and resistor 242. Input terminal $f$ of GATE D is also connected to receive a triggering input signal from switch $S_3$ by way of delay circuit 244, diode 246, and interconnecting line 248. The output terminal $t_5$ from GATE E is then connected to the input terminal $i$ of inverting GATE G from whence the inverted output signal at terminal $t_7$ is directed through a diode 254 to line 280.

At the commencement of a photographic cycle, after energization of branch power line 250 and prior to energization of solenoid 100 during which interval no magnetic field is provided, the output contact 110 at Hall effect switching device 98 exhibits a "high" status which in turn is inverted to a "low" status by inverting GATE F. The "low" status signal at output terminal $t_6$ is then directed to common input terminals $g$ of Nand GATE E so as to provide a "high" status output signal at terminal $t_5$. As is readily apparent, the input signals at input terminals $e$ and $f$ to Nand GATE D are at a "high" status level so as to provide a "low" status at output terminal $t_4$ thus coinciding with the "low" status signal at common input terminals $g$. The "high" status signal at output terminal $t_5$ is thereafter inverted by GATE G to a "low" status signal which is then connected to line 280 by way of diode 254.

Upon energization of solenoid 100, plunger 104 retracts into bobbin 88 so as to drive the blades 60 and 62 to their fully closed position. Energization of solenoid 100 also provides a high magnetic field, the flux lines of which are generally confined to a low reluctance loop as defined by the ferromagnetic plunger 104 and bracket 102. As the plunger 104 retracts into the bobbin 88 the air gap between the bracket 102 and plunger 104 decreases, thus operating to increase the magnetic field intensity across the transverse slot 114 within which the Hall effect switching device 98 is situated. When the magnetic field intensity across the slot 114 and Hall effect switching device 98 reaches a predetermined level, the Hall effect switching device 98 responds by changing the output signal level at contact 110 to a "low" status.

Timing capacitor 216 provides a slight time delay to insure that plunger 104 is fully seated in its retracted position before inverter GATE F is switched to provide a "high" status signal at output terminal $t_6$. The time delay provided by timing capacitor 216 insures that the output signal from switching circuit 281 will not change until after the plunger 104 has been fully retracted regardless of slight variations in the output potential of battery 202. Any such change in the output potential of the battery 202 operates to make the exact position of the plunger 104 unpredictable when the predetermined level of magnetic field intensity is reached. This in turn also makes the exact moment at which the Hall effect device 98 switches unpredictable. Therefore, the time delay of capacitor 216 is provided to be sufficiently long to insure that the output signal level of circuit 281 will not change prior to full retraction of the plunger 204 regardless of when the Hall effect switching device actually switches.

The change of output signal at terminal $t_6$ operates to switch the latching circuit 228 from a "high" status to a "low" status at output terminal $t_5$. The output terminal $t_5$ is thereafter latched at the "low" status level regardless of the change in output signal from the Hall effect switching device 98 and the "low" status output of terminal $t_5$ will only change upon receipt of a trigger signal from switch $S_3$ as received by way of line 248. In this manner, solenoid 100 may be powered down and energized at a lower current level in the fully retracted position without effecting the output of switching circuit 281.

The receipt of a "high" status signal at output terminal $t_7$ from inverter GATE G alters the $b$ gate input terminal status at line 278 from a "low" to a "high" level. A change of the $b$ gate input terminal status from a "low" to a "high" level in turn alters the output terminal $t_3$ of GATE C. During the first event of a photographic cycle, the output $t_3$ at line 310 of GATE C is "high." This "high" status output is established as a result of a "low" present at line 312 and introduced to input terminal $a$. Line 312 is connected to line 282, the latter providing a common coupling of the corresponding inputs of GATES A and B. Gate input terminal $d$ remains "low" in consequence of its connection through lines 218, 220 and closed switch $S_5$ to ground.

Input terminal $b$, being coupled to line 280 and switching circuit 281, alters from a "low" status to a "high" status upon the actuation of solenoid 100 and closure of blades 60, 62. The resultant "low" output $t_3$ of GATE C, when introduced through line 310, signals a motor control function 314 to energize motor 120. Control function 314 is energized from primary power line 200 through line 316 and is coupled to ground through line 318. The resultant energization of motor 120 drives phase control cam 126 from gear train 124 to effect the release or unlatching of reflex component 40 for movement from its viewing-focusing position 40 (FIG. 1). When reflex component 40 begins to rise from position 40, tab 132 of ram 122 is released from contact with leaf 134 of switch $S_5$ and switch $S_5$ opens.

As disclosed as event No. 3 in FIG. 5, the opening of switch $S_5$ alters the status of input terminal $d$ of GATE C to a "high" condition and the resultant output $t_3$ of the gate becomes "high." A "high" status at line 310 serves to signal motor control function 314 to de-energize motor 120.

As a reflex component 40 closely approaches its exposure mode position at 40'', switch $S_3$, connected within line 328 between line 252 and ground, is opened in consequence of the movement of ram 122. Represented as event No. 4 in FIG. 5, the opening of switch $S_3$ serves to activate an R-C timing network identified generally at 330. Formed of a timing resistor 332 and a timing capacitor 334 coupled within line 336 between ground and branch power line 252, network 330 serves to impose a delay to the commencement of exposure regulation. This delay is selected having a time constant sufficient to permit reflex component 40 to fully seat at its position 40''. Network 330 is activated upon removal of a shunt about capacitor 334 which is constituted by a line 338 and diode 340 and connected from a point intermediate capacitor 334 and resistor 332 to ground through a diode 340 and switch $S_3$. Diode 340 serves to isolate line 338 from spurious signals and the like. Similarly a diode 342 connected at line 328 above switch $S_3$ isolates line 252 from spurious signals.

Following an appropriate time-out of network 330, a threshold signal is developed at input 274 of Schmitt trigger 268, thereby triggering the Schmitt trigger to alter its output at line 266 to a "high" status. This "high" status is introduced to line 264 to simultaneously alter the state of all common gate inputs $c$ to a "high" or 1 status. Such alteration changes the output $t_2$ of GATE B to a "high" status, thereby abruptly terminating current flow in line 298 and de-energizing winding 86 of solenoid 100. With this de-energization, blades 60 and 62 of exposure mechanism 54 commence to open under the force of spring 90.

The opening of switch $S_3$ additionally provides a high status to line 249 wherein the high status incurs a time delay through circuit 244 prior to connection by way of line 248 to gate input terminal $f$. The change of input at gate terminal $f$ from a "low" status to a "high" status operates to switch the output at $t_4$ from a "high" status to a "low" status thus switching the input at common terminal $g$ from a "high" status to a "low" status. The output signal at $t_5$ is thus switched from a "low" status to a "high" status while the output signal at $t_7$ switches from a "high" status to a "low" status. The "low" status is then connected to common terminals $b$ by way of lines 280 and 278. In this manner, the galvano-magnetic effect switching circuit 281 of the present invention is reset by the opening of switch $S_3$ at the commencement of an exposure cycle as shown in block 5 in FIG. 5.

Simultaneously with the de-energization of winding 86, a signal is imposed from line 264 through an inverter 348 to trigger an electronic switch shown generally at 350. When so triggered, switch 350 removes capacitor 356. The removal of this shunt activates light sensitive network 260 which is described in greater detail in U.S. Pat. by J. P. Burgarella, entitled, "Automatic Exposure Control System with Fast Linear Response," No. 3,620,143. The output of this light sensitive network 260 at line 292 represents an integrated valuation of scene lighting as witnessed at the optical path of camera 10 and varied in accordance with the sensitometric properties of the film being exposed.

The adjusted output from network 260 is presented along line 292 to Schmitt trigger 286. When the signal value at line 292 reaches the threshold or trigger level of Schmitt trigger 286, the output thereof at line 284 converts from a "low" to a "high" status. This conversion is represented in FIG. 5 as operational event No. 6. As displayed in those figures, the resultant "high" output at line 284 alters the status of common gate input terminal $a$ to a corresponding "high" status. The resultant outputs of GATES A and B are converted. For instance, output $t_1$ of GATE A is changed to a "high" status and output $t_2$ of GATE B is changed to a "low" status. A "high" output at line 294 forward biases the base-emitter junction of transistor $Q_3$ thereby energizing solenoid winding 86 from line 298, in turn, causing solenoid 100 to block the optical path of camera 10 by closing blades 60 and 62. This action terminates an exposure interval.

As blades 60 and 62 are closed, galvano-magnetic effect switching circuit 281 is again switched in the above described manner such that output terminal $t_7$ changes from a "low" status to a "high" status thus altering the status of input terminals $b$ at GATES A and C from a "high" to a "low" status. As depicted by event No. 7 in FIG. 5, the latter input alteration changes the output $t_3$ of GATE C to a "low" status, thereby activating motor control function 314 to, in turn, energize motor 120. Thus energized, motor 120 rotates cycle phase cam 126 to drive cam 122 rearwardly, thereby cocking or returning reflex component 40 to position 40. Simultaneously, an exposed film unit 38 is processed through rotating process rolls 160 and 162.

As reflex component 40 is driven from position 40", switch $S_3$ is closed, thereby reactivating the shunt imposed by line 338 about timing capacitor 334. The output of Schmitt trigger 268 returns to a "low" status to, in turn, change the status of common gate input terminals $c$ to a "low" status.

When reflex component 40 is seated in its viewing-focusing position at 40, tab 132 of ram 122 recloses switch $S_5$ by urging leaf 134 into contact with leaf 136. This action changes the condition of gate input terminal $d$ from a "high" to a "low" status to, in turn, change output $t_3$ at line 310 to a "high" status, thereby de-energizing motor control function 314 to stop motor 120.

The final closing of switch $S_5$ also resets latching circuit 206 through lines 218 and 256 and de-energizes the entire circuit. Upon the consequent de-energization of the control circuit, the input terminal conditions to the gating functions are re-aligned to permit the generation of a next succeeding photographic cycle.

As is should be readily appreciated, the use of galvano-magnetic effect switching circuit 281 in place of a conventional mechanical switch controlled through movement of the solenoid plunger 104 provides for a substantial improvement in camera reliability by eliminating the adverse effects attributable to mechanical switch bounce.

It readily can be seen that many variations and modifications of the present invention are possible in the light of the aforementioned teachings, and it will be apparent to those skilled in the art that various changes in form and arrangement of components may be made to suit requirements without departing from the spirit and scope of the invention. It is, therefore, to be understood that within the scope of the appended claims, the instant invention may be practiced in a manner otherwise than is specifically described herein.

What is claimed is:

1. Photographic apparatus comprising:
   means actuable to sequentially perform a first function and a second function in the course of producing a photographic record;
   means for actuating said function performing means to perform said first function, said actuating means including electrically energizable means for establishing a magnetic field and a displaceable member operably assocsiated with said magnetic field to be displaced from one position to another position responsive to an energization of said electrically energizable means, said member serving to establish a path for said magnetic field having a reluctance which varies as said member moves from its said one position towards its said other position;
   means for selectively coupling said electrically energizable means to a source of electrical energy;
   galvano-magnetic effect means, operably positioned with respect to said magnetic field, for producing an output signal responsive to said magnetic field achieving a predetermined characteristic determined by both the energization condition of said electrically energizable means and the reluctance of said variable reluctance path; and
   means responsive to said output signal for actuating said function performing means to perform said second function.

2. The photographic apparatus of claim 1 wherein:
   said electrically energizable means includes an excitation winding and said member is a ferro-magnetic plunger retractable toward a position in said winding when said winding is energized; and
   said galvano-magnetic effect means includes a Hall effect switching device stationed in intercepting relation with respect to said variable reluctance path so as to have a select output signal condition responsive to said magnetic field achieving said predetermined characteristic.

3. The photographic apparatus of claim 2 wherein said actuating means includes a bobbin about which said excitation winding is wound, together with a ferromagnetic bracket interconnecting the opposed ends of said bobbin; said bracket cooperating with said plunger to define said variable reluctance path and being transversely slotted for receipt of said Hall effect switching device whereby said magnetic field across said slot and Hall effect switching device increases to said predetermined characteristic as said plunger retracts into said bobbin such that the output of said Hall effect switching device abruptly changes to said select output signal condition at said predetermined characteristic so as to indicate a predetermined position for said plunger when said actuating means is energized at a preselected level.

4. The photographic apparatus of claim 2 wherein said galvano-magnetic effect means further includes a delay means for delaying the time of transmission of said select output signal condition from said Hall effect switching device in response to said magnetic field reaching said predetermined characteristic thus permitting said select output signal condition from said Hall effect device to be made responsive to a predetermined magnetic field characteristic not necessarily coinciding with the fully retracted plunger position, said delay time being of sufficient duration to enable said plunger to always assume the fully retracted position before said select signal condition from said Hall effect switching device is transmitted by said delay means.

5. The photographic apparatus of claim 1 wherein said galvano-magnetic effect means includes:
 a Hall effect switching device having a select output signal condition responsive to said predetermined magnetic field characteristic;
 triggering means for providing a trigger signal in response to a predetermined event occurring in the course of producing said photographic record; and
 latch means responsive to both said select output signal condition of said Hall effect switching device and the trigger signal of said triggering means for providing at least two output signal conditions the first of which is indicative of a magnetic field intensity below said predetermined characteristic and the second of which is assumed as the result of said magnetic field intensity increasing to said predetermined characteristic to provide said select output signal condition from said Hall effect switching device, said second output signal condition from said latch means thereafter remaining latched regardless of the level of said magnetic field intensity and changing back to said first output signal condition only upon receipt of said trigger signal from said triggering means, in response to said predetermined event.

6. The photographic apparatus of claim 5 including a power down means for reducing the level of energization introduced into said actuating means subsequent to said plunger reaching the fully retracted position in order to maintain the plunger in the fully retracted position wherein said reduced level of energization further operates to reduce the level of magnetic field intensity below said predetermined characteristic so as to effect removal of said select output signal condition from said Hall effect switching device without changing said output signal of said galvano-magnetic effect means which remains latched by said second output signal condition from said latching means.

7. A photographic camera apparatus of the type adapted for use with a self-contained source of electrical power comprising:
 optical path means for focusing a scene to be phtographed and exposing photosensitive material located at an exposure plane to receive light from said scene;
 reflex means actuable to move between a focusing orientation covering said exposure plane and an exposure position for converting said optical path between focusing and exposure configurations;
 exposure mechanism means having at least one element drivable toward a terminal position for blocking the passage of light along said optical path means;
 drive means including a displaceable drive member cooperatively associated with electro-magnetic means to define a variable reluctance path responsive to the position of said displaceable member, said drive means being energizable from said source of electrical power to drive said exposure mechanism means element and operative to assume an increased magnetic field intensity condition when said element approaches said terminal position;
 control means for selectively actuating said reflex means and electro-magnetic means in a predetermined order to perform a photographic cycle and additionally including galvano-magnetic effect means in intercepting relationship with respect to said variable reluctance path, said galvano-magnetic effect means having a predetermined output signal condition selectively responsive to a predetermined magnetic field condition thereacross which magnetic field condition is determined by the energization condition of said electro-magnetic means as well as the position of said displaceable member wherein said predetermined output signal condition is determinative in selectively actuating said electromagnetic means.

8. The photographic camera apparatus of claim 7 including film processing means together with electric motor means energizable from said source of electrical power for selectively driving said film processing means wherein said predetermined output signal condition from said galvano-magnetic effect means is also determinative in selectively actuating said electric motor means.

9. The photographic apparatus of claim 7 wherein:
 said electro-magnetic means includes an excitation winding and said displaceable member includes a plunger drivably connecting said exposure mechanism element wherein said plunger is retractable toward a terminal position inside said winding upon establishment of a high intensity magnetic field condition when said winding is energized; and
 said galvano-magnetic effect means includes a Hall effect switching device stationed in intercepting relation with respect to said variable reluctance path so as to have an output signal condition responsive to said predetermined magnetic field condition.

10. The photographic apparatus of claim 9 wherein said tractive electro-magnetic means includes a bobbin about which said excitation winding is wound, together with a ferromagnetic bracket interconnecting the opposed ends of said bobbin, said bracket cooperating with said fully retracted plunger to define a low reluctance loop and being transversely slotted for receipt of said Hall effect switching device in a manner whereby said magnetic field intensity across said slot and Hall effect switching device increases to said predetermined level of intensity as said plunger retracts into said bobbin such that the output signal condition of said Hall effect switching device abruptly changes at said predetermined level of intensity.

11. The photographic apparatus of claim 9 wherein said galvano-magnetic effect means further includes delay means for delaying the time of transmission of a change in the output signal condition from said Hall effect switching device in response to said magnetic field intensity reaching said predetermined level of intensity thus permitting said change in output signal condition from said Hall effect device to be made responsive to a predetermined level of magnetic field intensity not necessarily coinciding with the retracted plunger position; said non-coincidence resulting from variations in the output level of said self-contained source of electrical power and said delay time being of sufficient duration to enable said plunger to always reach the retracted position coinciding with the terminal position of said exposure mechanism element before said change in signal condition from said Hall effect switching device is transmitted by said delay means regardless of said variations in the output level of said self-contained source of electrical power.

12. The photographic apparatus of claim 7 including:
triggering means for providing a trigger signal to said galvano-magnetic effect circuit wherein said trigger signal reaches said galvano-magnetic effect means subsequent to said reflex means moving to said exposure position, and wherein said galvano-magnetic effect means includes:
a Hall effect switching device having an output signal condition responsive to said predetermined magnetic field condition; and
latch means responsive to both the output signal condition of said Hall effect switching device and the trigger signal of said triggering means and having at least two output signal conditions, the first of which is indicative of a magnetic field intensity below said predetermined level of intensity and the second of which is assumed as the result of said magnetic field intensity increasing above said predetermined level of intensity to change the output signal condition of said Hall effect switching device, said second output signal condition for said latch means thereafter remaining latched regardless of the level of said magnetic field intensity or output signal condition from said Hall effect switching device and changing back to said first output signal condition only upon receipt of said trigger signal from said triggering means subsequent to said reflex means moving to said exposure position.

13. The photographic apparatus of claim 12 including a power down means for reducing the level of energization introduced into said electromagnetic means subsequent to said plunger reaching a retracted terminal position coinciding with the terminal position of said exposure mechanism element in order to maintain the plunger in the retracted position wherein said reduced level of energization further operates to reduce the level of magnetic field intensity below said predetermined level of intensity so as to change the output signal condition of said Hall effect switching device without changing the output signal condition of said galvano-magnetic effect means which remains latched by said second output signal condition from said latching means.

14. The photographic apparatus of claim 12 including electric motor means energizable from said source of electrical power wherein said triggering means includes:
ram means drivably connected to said motor means for actuating said reflex means,
switch means responsive to movement of said ram means for providing a change in output signal condition at some time subsequent to initial release of the reflex means from the focusing orientation covering said exposure plane and prior to seating of the reflex means in the exposure position, and
delay means for delaying the transmission of the change in output signal condition from said switch means to said latch means until after the reflex means seats in the exposure position.

15. A galvano-magnetic effect control device for photographic apparatus of the type adapted for use with a self-contained source of electrical power comprising:
drive means including a displaceable drive member cooperatively associated with electromagnetic means to define a variable reluctance path responsive to the position of said displaceable member, said drive means being energizable from said source of electrical power;
a Hall effect switching device stationed in intercepting relationship with respect to said variable reluctance path in order to provide an output signal condition responsive to a predetermined level of magnetic field intensity thereacross; and
control circuit means for converting the output signal condition response of said Hall effect switching device to at least one control signal suitable for performing various control functions in the photographic apparatus during the course of producing a photographic cycle.

16. The galvano-magnetic effect control circuit of claim 15 wherein said control circuit means includes:
a delay circuit for delaying the time of transmission of a change in the output signal condition from said Hall effect switching device in response to said magnetic field intensity reaching said predetermined level of intensity during energization of said electro-magnetic means to move said displaceable drive member to assume one of two terminal positions, thus permitting said change in output signal condition from said Hall effect device to be made responsive to a predetermined level of magnetic field intensity not necessarily coinciding with said one terminal position of said drive means wherein said delay time is of sufficient duration to enable said drive means to assume said one terminal position prior to transmission of said change in signal condition from said Hall effect switching device by said delay means.

17. The galvano-magnetic effect control circuit of claim 15 wherein said control circuit means includes:
a latch circuit responsive to both the output signal condition of said Hall effect switching device and a trigger signal and having at least two output signal conditions, the first of which is indicative of a magnetic field intensity below a predetermined level and the second of which is assumed as the result of said magnetic field intensity increasing above said predetermined level to change the output signal condition of said Hall effect switching device, said second output signal condition from said latch circuit thereafter remaining latched regardless of the level of said magnetic field intensity or output signal condition from said Hall effect switching device and changing back to said first output signal condition only upon receipt of said trigger signal.

* * * * *